No. 723,701. PATENTED MAR. 24, 1903.
M. MESSNER.
SHELL FOR MOUTH HARMONICAS.
APPLICATION FILED MAR. 22, 1902.
NO MODEL.

Witnesses:
Albert Popkins
John J. Nelligan

Inventor:
Matthias Messner
By Sturtevant & Greeley
Attys

UNITED STATES PATENT OFFICE.

MATTHIAS MESSNER, OF TROSSINGEN, GERMANY.

SHELL FOR MOUTH-HARMONICAS.

SPECIFICATION forming part of Letters Patent No. 723,701, dated March 24, 1903.

Application filed March 22, 1902. Serial No. 99,983. (No model.)

*To all whom it may concern:*

Be it known that I, MATTHIAS MESSNER, a citizen of the German Empire, residing at Trossingen, in the Kingdom of Würtemberg, Empire of Germany, have invented certain new and useful Improvements in Shells for Mouth-Harmonicas, of which the following is a description, reference being had to the accompanying drawings and to the letters of reference marked thereon.

The present invention relates to an improved harmonica-shell provided with a rectangular recess and with flanges turned outward, so that they can be placed between the cover-plates of an ordinary mouth-harmonica, thereby securing the shell to the instrument.

The object of the invention is illustrated on the accompanying drawings, in which—

Figure 1:
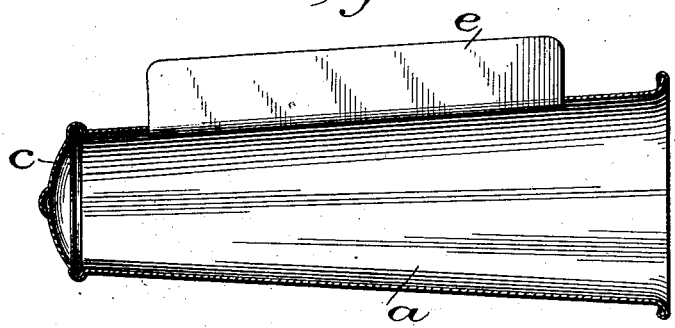
Figure 2:
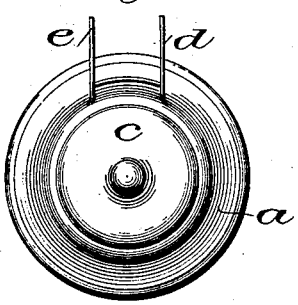
Figure 3:
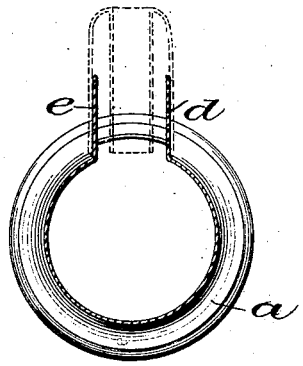
Figure 4:
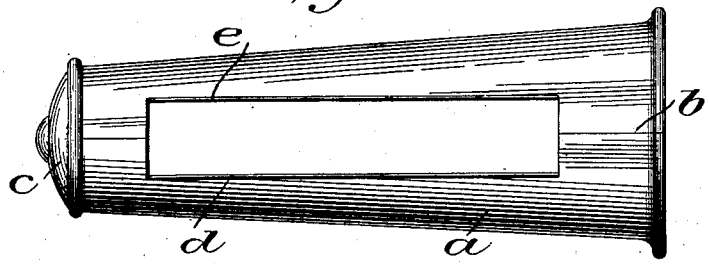

Figure 1 is a side view of the shell; Fig. 2, a top view of the same; Fig. 3, an end view, the harmonica being shown in dotted lines. Fig. 4 is a front view of the shell.

The conical shell consists of a metal plate $a$, cut and bent into the desired form, the two edges of the metal plate $a$ being soldered at the line $b$. The top end of the shell is closed by a cover $c$, soldered onto the body $a$ or fixed thereto in any other suitable manner. At the center of the shell flanges $d$ and $e$ are cut into the body $a$. These flanges are then bent outwardly, Fig. 1, so that they leave a rectangular space at the center of the shell-body, the said space being just sufficient to take up the instrument. This shell, as represented in the drawings, can easily be secured to any ordinary mouth-harmonica, the flanges $d$ $e$ simply being pushed into the cover-plates of an instrument, as shown in Fig. 3.

Having now particularly described and ascertained my invention, I declare that what I claim is—

A shell for harmonicas comprising a body open at one end and provided at one side with a longitudinal opening, and flat parallel flanges projecting outwardly from the edges of said longitudinal opening, and spaced apart a distance to enter beneath the two cover-plates of a harmonica, substantially as described.

In testimony whereof I affix my signature in presence of two witnesses.

MATTHIAS MESSNER.

Witnesses:
 WALTER SCHNAEBSCH,
 RUDOLF STOERZBACH.